Dec. 26, 1961 T. LINDBOM 3,014,373
ACCELERATION FEEDBACK SYSTEM
Filed March 4, 1959

INVENTOR.
TORSTEN LINDBOM
BY
Brumbaugh, Free, Graves & Donohue
his ATTORNEYS.

United States Patent Office 3,014,373
Patented Dec. 26, 1961

3,014,373
ACCELERATION FEEDBACK SYSTEM
Torsten Lindbom, Blue Point, N.Y., assignor to Fairchild Stratos Corporation, a corporation of Maryland
Filed Mar. 4, 1959, Ser. No. 797,268
8 Claims. (Cl. 73—515)

This invention relates to acceleration feedback systems and, more particularly, to a new and improved system including a pneumatic device responsive to acceleration and a control device to generate an output proportional to an acceleration.

Although many acceleration responsive devices are known, they are generally complex in structure and require sensitive adjustment. Furthermore, in certain applications, it is desirable to include a feedback control responsive only above predetermined values of acceleration.

Accordingly, it is an object of this invention to provide simple and efficient apparatus for detecting acceleration and generating a feedback signal in response thereto.

Another object of the invention is to provide apparatus of the above character including a pneumatic feedback control device adapted to provide an output proportional to acceleration.

These and other objects of the invention are attained by pneumatically biasing a movable member to a normal position and detecting variations in pneumatic pressure in response to motion of the member away from the normal position. More particularly, a movable valve member positioned between a pair of opposed partially opened valve seats is linked to an input member through inertia means so that acceleration of the input member drives the movable valve member toward one valve seat and away from the other, creating a pneumatic pressure differential in conduits leading to the valve seats. Also, a feedback control device having an output member normally retained in a neutral position by bias means responds to a pressure differential greater than the bias to displace the output member according to the direction and magnitude of the acceleration.

Further objects and advantages of the invention will be apparent from a reading of the following description in conjunction with the accompanying drawings in which.

Figure 1:
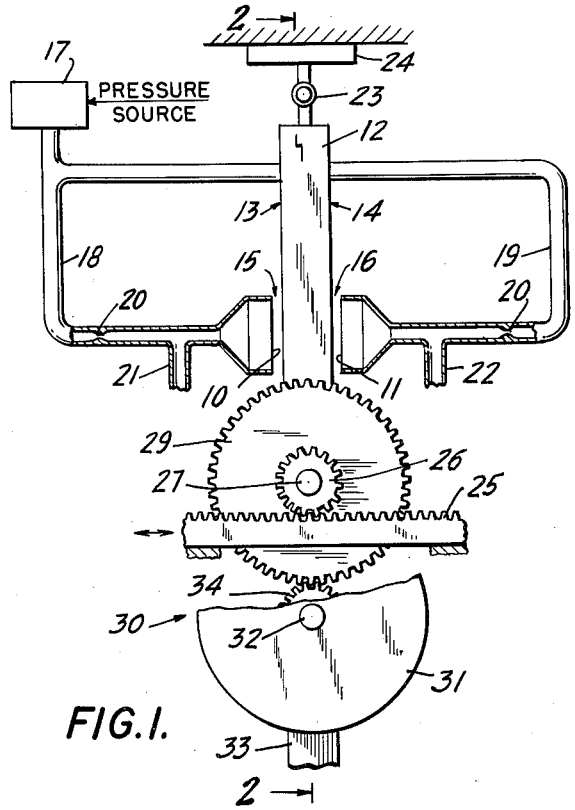
FIG. 1 is a schematic view in elevation partly broken away showing a portion of a typical acceleration responsive system arranged according to the invention.
Figure 2:
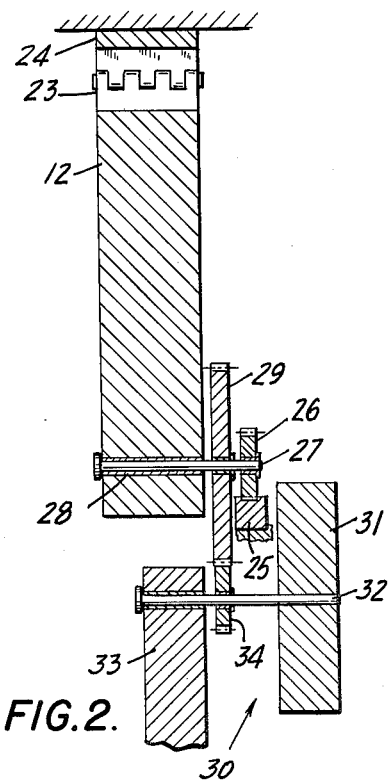
FIG. 2 is a sectional side view taken on the lines 2—2 of FIG. 1 and looking in the direction of the arrows.

In the representative acceleration responsive device shown in FIGS. 1 and 2, two opposed valve seats 10 and 11 are positioned on opposite sides of a movable valve control member 12. When the control member 12 is at a central location between the seats 10 and 11, as illustrated in FIG. 1, its opposite side surfaces 13 and 14 are suitably spaced from the valve seats 10 and 11 by equal gaps 15 and 16, respectively, to permit air under pressure to escape from each of the seats at a controlled rate.

The movable valve member 12 is urged toward its central position between the seats 10 and 11 and is normally maintained in that position by a pneumatic bias produced by applying the same pneumatic pressure, derived from a pressure source 17, to two conduits 18 and 19 leading to the two valve seats 10 and 11, respectively. Each of the conduits 18 and 19 includes a restricted orifice 20 and two output ducts 21 and 22 detect the pneumatic pressures at the valve seats 10 and 11, respectively. Therefore, any difference in the widths of the gaps 15 and 16 produces a proportional pressure difference in the ducts 21 and 22.

In the illustrated embodiment of the invention, the movable valve member 12 comprises a pendulum suspended by a hinge 23 from a fixed supoprt 24 to permit a swinging motion between the two valve seats 10 and 11. The valve seats 10 and 11 also contribute stops limiting the motion of the pendulum 12 in either direction and are preferably arranged to shut off the flow of air completely when in contact with the corresponding side surface of the pendulum. If desired, any other well known means for supporting a movable valve member between two opposed valve seats may be utilized in apparatus arranged according to the invention.

In order to apply accelerative forces to the pendulum 12, an acceleration input member comprising a rack 25, extending substantially perpendicularly to the pendulum and supported for longitudinal movement in either direction, is linked to the pendulum through a pinion 26 affixed to an axial shaft 27. As best seen in FIG. 2, the shaft 27 is rotatably supported in the pendulum 12 by a bearing 28 and also carries a gear 29 adapted to drive an ineria device 30. This device may comprise, for example, a flywheel 31 secured to a shaft 32 which is rotatably mounted in a fixed support 33 and linked to the gear 29 through a pinion 34. If desired, substantially the same effect can be obtained by mounting the inertia device 30 on the pendulum 12 rather than on the fixed support 33.

As pointed out hereinafter, the inertia device 30 provides an inertia linkage between the input member 25 and the movable valve member 12 such that any acceleration of the input member generates a force urging the movable member 12 away from its central position. Inasmuch as this force opposes the pneumatic biasing force generated by the pneumatic pressure applied to the two valve seats 10 and 11, any desired relation between the acceleration applied to the input member and the magnitude of the resulting deflection of the member 12 may be obtained by appropriate selection of the moment of inertia of the flywheel 31, the ratio of the gears 26, 29, and 34, the area of the valve seats 10 and 11 and the orifice 20 and the pressure supplied by the source 17.

Figure 3:
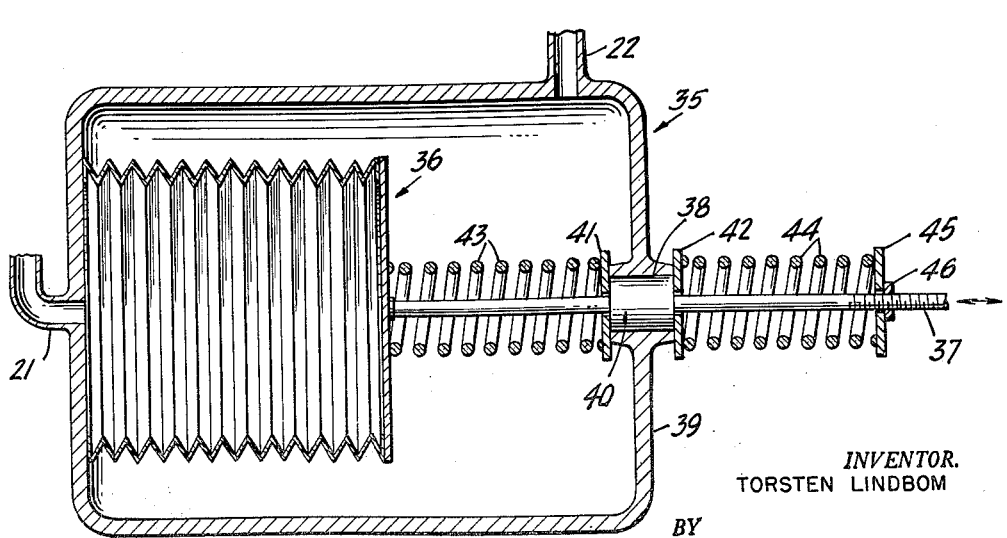
FIG. 3 is a schematic sectional view of an acceleration feedback device arranged according to the invention.

As illustrated in FIG. 3, the ducts 21 and 22 lead to a pressure responsive feedback device 35 wherein the pneumatic pressures from the two ducts are applied to opposite sides of a bellows 36 mounted within a housing 39. An output shaft 37, which passes through a fluid-tight opening 38 in the housing 39, is linked to the bellows 36 and receives a force proportional to the pressure difference between the ducts 21 and 22. At the point where it passes through the opening 38, the shaft 37 includes an enlarged portion 40 having a length equal to the thickness of the housing 39 at the opening 38. Two annular members 41 and 42 supported on the shaft 37 are urged against opposite sides of the housing and the enlarged portion 40 by opposed springs 43 and 44, respectively, the opposite end of the spring 43 engaging the bellows device 36 while the spring 44 is supported by another annular member 45 backed by a nut 46 mounted on the shaft 37. The springs 43 and 44 are preferably arranged to provide a displacement of the output shaft having a linear relation to the pressure difference applied to the bellows and, if desired, they may be suitably selected to prevent any motion of the output shaft 37 for pressure differences below a predetermined value large enough to assure a fixed zero point when the system is at rest, thereby providing high accuracy of response.

In operation, acceleration of the input rack 25 to the left, as viewed in FIG. 1, for example, tends to rotate the inertia device 30 and because of the inertia of the device urges the pendulum 12 toward the valve seat 10 with a force proportional to the acceleration. This decreases the spacing of the gap 15 and increases that of the gap 16, thereby increasing the pneumatic pressure applied to the surface 14 by air from the valve seat 10 and decreasing that applied by air from the seat 11. As a result, the pendulum is displaced to a position at which the pneumatic force applied to the pendulum balances the force resulting from acceleration of the input member 25 so that the difference in pressure in the ducts 21 and 22 is proportional to the acceleration.

Pneumatic pressure difference signals generated in this manner are transmitted by the ducts 21 and 22 to opposite sides of the bellows 36 in the feedback device 35, urging the shaft 37 in a longitudinal direction corresponding to the pressure difference with a force proportional to the difference. If the force applied to the shaft is greater than any bias of the springs 43 and 44, the shaft 37 is displaced by an amount proportional to the acceleration, thereby providing a mechanical acceleration feedback signal which can be utilized to control the source of the acceleration.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. Acceleration feedback apparatus comprising a movable member, valve means having an opening which is varied by motion of the movable member, pneumatic pressure means including the valve means normally maintaining the movable member in a selected position and generating a pressure dependent upon the position of the movable member, an input member, inertia means movably linked to both the input member and the movable member so as to transmit only accelerative forces from the input member to the movable member and adapted to transmit a force to the movable member tending to displace it from the selected position in response to acceleration of the input member thereby producing a change in pneumatic pressure in the pressure means, and means responsive to a change in pneumatic pressure in the pressure means caused by displacement of the movable member from the selected position to provide an acceleration feedback signal.

2. Acceleration feedback apparatus comprising a movable member, valve means having an opening which is varied by motion of the movable member, pneumatic pressure means including the valve means directing a current of fluid toward the movable member to normally maintain the member in a selected position and generating a pressure dependent upon the position of the movable member, an input member, inertia means movably linked to both the input member and the movable member so as to transmit only accelerative forces from the input member to the movable member and adapted to transmit a force to the movable member tending to displace it from the selected position in response to acceleration of the input member thereby producing a change in pneumatic pressure in the pressure means, and means responsive to a change in pneumatic pressure in the pressure means resulting from alteration of the current of fluid by displacement of the movable member from the selected position to provide an acceleration feedback signal.

3. In acceleration feedback apparatus utilizing an input member, inertia means and a movable member linked to the input member through the inertia means to be displaced in response to acceleration of the input member, the inertia means being movably linked to both the input member and the movable member so as to transmit only accelerative forces from one to the other, valve seat means positioned in the path of displacement of the movable member whereby the valve opening is varied by displacement of the movable member, and pneumatic pressure means supplying a current of fluid to the valve seat means to apply pneumatic force to the movable member which varies with the displacement of the member so that displacement of the member produces a corresponding change in pressure in the pressure means.

4. Acceleration feedback apparatus comprising a movable member, valve means having an opening which is varied by motion of the movable member, pneumatic pressure means including the valve means normally maintaining the movable member in a selected position and generating a pressure dependent upon the position of the movable member, an input member, inertia means movably linked to both the input member and the movable member so as to transmit only accelerative forces from the input member to the movable member and adapted to transmit a force to the movable member tending to displace it from the selected position in response to acceleration of the input member thereby producing a change in pneumatic pressure in the pressure means, drive means responsive to changes in the pneumatic pressure applied to the movable member resulting from displacement of the member, and an output member responsive to the drive means to provide an acceleration feedback signal.

5. Acceleration feedback apparatus comprising a movable member, valve means having an opening which is varied by motion of the movable member, pneumatic pressure means including the valve means normally maintaining the movable member in a selected position and generating a pressure dependent upon the position of the movable member, an input member, inertia means movably linked to both the input member and the movable member so as to transmit only accelerative forces from the input member to the movable member and adapted to transmit a force to the movable member tending to displace it from the selected position in response to acceleration of the input member thereby producing a change in pneumatic pressure in the pressure means, drive means responsive to changes in the pneumatic pressure applied to the movable member resulting from displacement of the member, and an output member normally biased to a selected position and movable in response to a drive force greater than the biasing force to provide an acceleration feedback signal.

6. Apparatus according to claim 5 wherein the output member is biased by a pair of opposed spring means selected to provide displacement of the output member proportional to the acceleration of the input member.

7. Acceleration feedback apparatus comprising a movable member, valve means having an opening which is varied by motion of the movable member, pneumatic pressure means including the valve means directing a current of fluid toward the movable member to normally maintain the member in a selected position and generating a pressure dependent upon the position of the movable member, an input member, inertia means movably linked to both the input member and the movable member so as to transmit only accelerative forces from the input member to the movable member and adapted to transmit a force to the movable member tending to displace it from the selected position in response to acceleration of the input member therby producing a change in pneumatic pressure in the pressure means, driving means responsive to a change in pneumatic pressure in the pressure means resulting from alteration of the current of fluid by displacement of the movable member from the selected position, and an output member normally biased to a selected position and movable in response to a driving force greater than the biasing force to provide an acceleration feedback signal.

8. Acceleration feedback apparatus comprising a movable member, a pair of valve seats disposed on opposite sides of the movable member and adapted to be varied in opening by displacement of the movable member, an input member, inertia means movably linked to both the input member and the movable member so as to transmit only accelerative forces from the input member to the movable member and adapted to transmit a force to the movable member tending to displace it in response to acceleration of the input member, pneumatic pressure means supplying fluid to both valve seats to apply pneumatic force to opposite sides of the member to normally maintain the movable member in a selected position between the seats, orifice means restricting the flow of fluid to each of the valve seats thereby producing a change in pneumatic pressure in response to displacement of the movable member, bellows means, duct means transmitting pneumatic pressure from each of the valve seats to opposite sides of the bellows means, output shaft means driven by the bellows means in response to differences in pressure applied by the duct means, and bias means normally maintaining the shaft means in a selected position and preventing motion thereof in response to pressure differences below a predetermined value.

References Cited in the file of this patent

UNITED STATES PATENTS

| | | |
|---|---|---|
| 2,473,903 | Purifoy | June 21, 1949 |
| 2,520,944 | Lynn et al. | Sept. 5, 1950 |
| 2,672,335 | Keller | Mar. 16, 1954 |
| 2,874,711 | Anxionnaz | Feb. 24, 1959 |
| 2,939,470 | Kohr | June 7, 1960 |

FOREIGN PATENTS

| | | |
|---|---|---|
| 768,033 | Germany | May 26, 1955 |